(12) United States Patent
Akiyama et al.

(10) Patent No.: US 7,251,402 B2
(45) Date of Patent: Jul. 31, 2007

(54) ANTI-REFLECTION COATING FOR THE PASS-BAND OF PHOTONIC BANDGAP CRYSTAL

(75) Inventors: Shoji Akiyama, Gunma (JP); Ivan Celanovic, Cambridge, MA (US); Natalija Z. Jovanovic, Cambridge, MA (US); Francis O'Sullivan, Cambridge, MA (US); Kazumi Wada, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/210,231

(22) Filed: Aug. 23, 2005

(65) Prior Publication Data
US 2007/0053651 A1 Mar. 8, 2007

(51) Int. Cl.
*G02B 6/10* (2006.01)

(52) U.S. Cl. .............. 385/125; 385/129; 385/131

(58) Field of Classification Search ........ 385/125, 385/129–132
See application file for complete search history.

(56) References Cited

U.S. PATENT DOCUMENTS 6,879,766 B2 * 4/2005 Tomaru ............... 385/129
7,020,373 B2 * 3/2006 Shirane et al. ......... 385/130

OTHER PUBLICATIONS

Young, L. et al., "Low Pass and High-Pass Filters Consisting of Multilayer Dielectric Stacks," IEEE Transactions on Microwave Theory and Techniques, vol. MTT-14, No. 2, Feb. 1966, pp. 75-80.

* cited by examiner

*Primary Examiner*—Hemang Sanghavi
(74) *Attorney, Agent, or Firm*—Gauthier & Connors LLP

(57) ABSTRACT

Light transmission is maximized through the pass band of a photonic bandgap (PBG) crystal (having alternating high- and low-index material) while preserving high reflection for stop band. An anti-reflective coating (ARC) is used to coat the PBG crystal wherein the ARC material has a refractive index of $n=(n_{air} \times n_{high\ index\ material})^{1/2}$ and thickness around $\lambda c/8$ where $\lambda c$ is center wavelength.

14 Claims, 5 Drawing Sheets

ANTI-REFLECTION COATING FOR THE PASS-BAND OF PHOTONIC BANDGAP CRYSTAL

BACKGROUND OF THE INVENTION

1. Field of Invention

The present invention generally relates to photonic bandgap (PBG) crystals. More specifically, the present invention relates to an anti-reflective coating used in maximizing light transmission through the pass band of a PBG crystal.

2. Discussion of Prior Art

Prior art method stack high refractive index material and low index material alternatively whose thickness are $\lambda_c/(4n)$ where n is refractive index of each material and $\lambda c$ is central wavelength at which wavelength light is reflected effectively. This periodic structure is called photonic bandgap crystal (PBG hereafter).

High reflectance can be achieved around central wavelength (stop-band). But at the same time, several photonic states are formed in the pass-band of the crystal depending on the number of layers. For some devices such as wavelength filter where some light should be effectively reflected and other light should be transmitted depending on wavelength, these photonic states are not desirable since, even for pass-band, some portion of light is reflected. For example, approximately 25% light is reflected for pass-band wavelength (0.78-1.5 µm in FIG. 1).

For simple mono-layer device, such as ordinary solar cell, reflection can be suppressed by putting $\lambda c/4$ thick anti-reflection coating (ARC hereafter). But this simple concept is not applicable to PBG since PBG has 2 different kinds of bands (pass- and stop-bands) and is composed of stacked multi layers.

Whatever the precise merits, features, and advantages of the above mentioned prior art techniques, none of them achieves or fulfills the purposes of the present invention.

SUMMARY OF THE INVENTION

The present invention provides for a semiconductor structure that maximizes transmission of light through the pass-band of a photonic bandgap crystal, wherein the structure comprises: (a) a photonic bandgap crystal (PBG) comprising alternating layers of high-index (with refractive index of $n_{high\text{-}index\ material}$) and low-index material, with the PBG crystal having a center wavelength of $\lambda_c$; and (b) an anti-reflection coating (ARC) layer disposed on top of the PBG crystal wherein the ARC layer has a refractive index given by $n_{ARC} = \sqrt{n_{air} \times n_{high\text{-}indexmaterial}}$ and the ARC layer has a substantial thickness of $\lambda_c/8$.

The present invention also provides for a method to maximize transmission of light through pass-band of a photonic bandgap crystal, wherein the method comprises the steps of: (a) forming a photonic bandgap crystal (PBG) via depositing alternating layers of high-index and low-index material, wherein the high-index material has a refractive index of $n_{high\text{-}index\ material}$ and the PBG crystal has a center wavelength of $\lambda_c$; (b) depositing an anti-reflection coating (ARC) layer on top of the PBG crystal, wherein the ARC layer has a refractive index given by $n_{ARC} = \sqrt{n_{air} \times n_{high\text{-}indexmaterial}}$ and the ARC layer has a substantial thickness of $\lambda_c/8$. The structure formed based on the deposition of the ARC layer maximizes transmission of light through pass band of the PBG crystal while preserving high reflection of light through stop band of said PBG crystal.

The present invention also provides for a method to maximize transmission of light through pass-band of a photonic bandgap crystal, wherein the method comprises the steps of: (a) forming a photonic bandgap crystal (PBG) via depositing alternating layers of high-index and low-index material, wherein the high-index material has a refractive index of $n_{high\text{-}index\ material}$ and the PBG crystal has a center wavelength of $\lambda_c$; (b) forming a SiON anti-reflection coating (ARC) layer by introducing a gaseous composition comprising at least nitrous oxide (NO) on a Silicon (Si) substrate; and (c) adjusting concentrations of NO in said gaseous composition such that the SiON ARC layer has a refractive index given by $n_{ARC} = \sqrt{n_{air} \times n_{high\text{-}indexmaterial}}$ and the SiON ARC layer has a substantial thickness of $\lambda_c/8$. The structure formed based on the deposition of the SiON ARC layer maximizes transmission of light through pass band of the PBG crystal while preserving high reflection of light through stop band of said PBG crystal.

DESCRIPTION OF THE PREFERRED EMBODIMENTS

Figure 1:
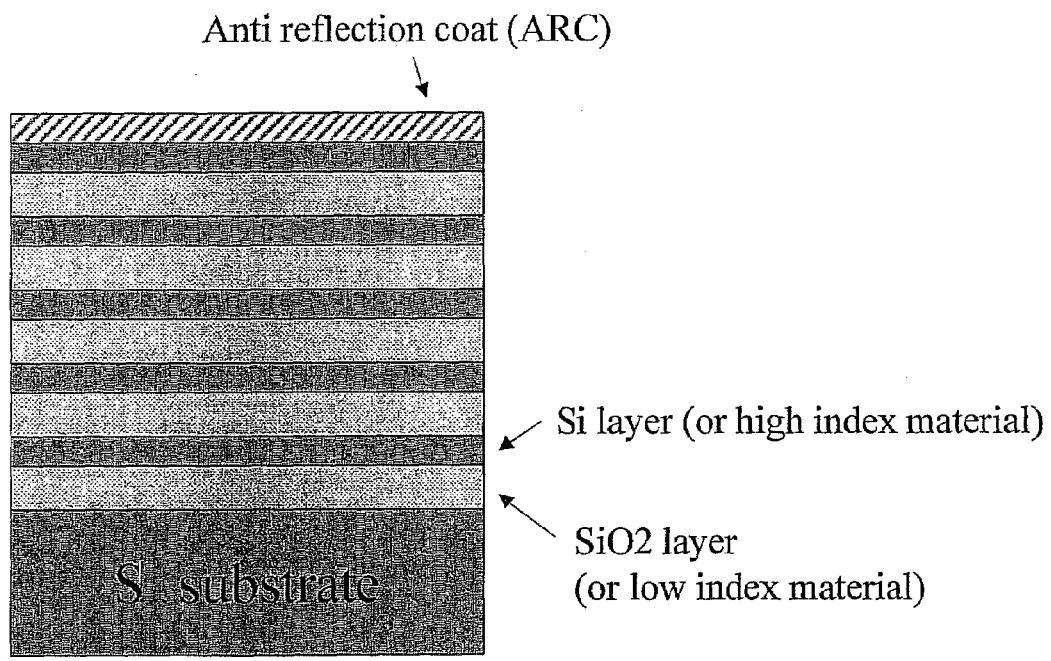
FIG. 1 shows the basic structure of proposed photonic bandgap crystal
Figure 2:
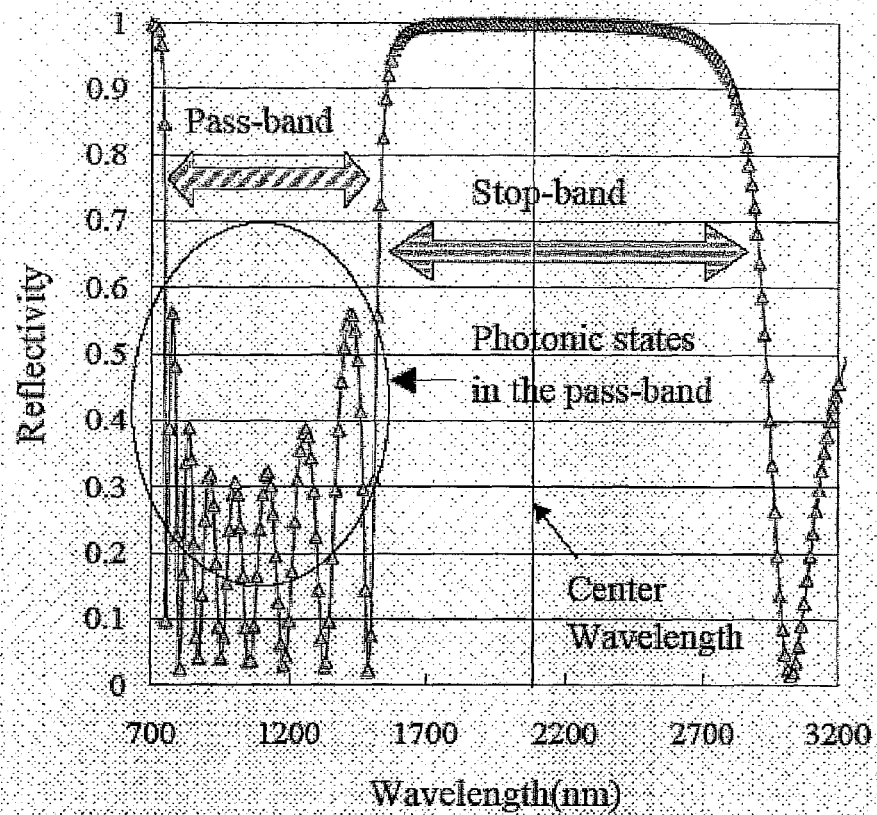
FIG. 2 shows the reflectivity of 5-pair Si/SiO$_2$ PBG ($\lambda c$=2.0 µm)

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention makes it possible to obtain the maximum transmission through pass-band of photonic bandgap crystal, which is often referred to as PBG, while preserving the high reflection for stop-band. This characteristic is useful for wavelength filter of photovoltaic devices, laser optics device, etc.

The present invention provides for a semiconductor structure that maximizes transmission of light through the pass-band of a photonic bandgap crystal, wherein the structure comprises: (a) a photonic bandgap crystal (PBG) comprising alternating layers of high-index (with refractive index of $n_{high\text{-}index\ material}$) and low-index material, with the PBG crystal having a center wavelength of $\lambda_c$; and (b) an anti-reflection coating (ARC) layer disposed on top of the PBG crystal wherein the ARC layer has a refractive index given by $n_{ARC} = \sqrt{n_{air} \times n_{high\text{-}indexmaterial}}$ and the ARC layer has a substantial thickness of $\lambda_c/8$.

FIG. 1 illustrates one example of the PBG crystal used in conjunction with the present invention. The PBG crystal has a center wavelength ($\lambda_c$) at 2.0 µm and has 5 pairs (10 layers) of Si/SiO$_2$ layers such that Si layer is the top most layer. FIG.

2 depicts a graph showing PBG reflectivity where center wavelength ($\lambda_c$)=2.0 μm, wherein $T_{Si}$=0.143 μm and $T_{SiO2}$=0.345 μm (No. of pairs of Si/SiO$_2$ layers=5). Returning to the discussion of FIG. 1—according to the present invention, another ARC layer is put on PBG whose refractive index is expressed as follows (FIG. 1).

$$n_{ARC}=\sqrt{n_{air} \times n_{top}}$$

where $n_{ARC}$, $n_{air}$ and $n_{top}$ denote the refractive indices of additionally coated or deposited layer, air (usually 1.0), and top layer (in this example, $n_{top}$=3.5) before putting additional layer. If the top layer is Si, $n_{ARC}$ becomes 1.87. The thickness should be around $\lambda_c/8$ (±30%). The effect of $\lambda_c/8$ thick layer is anti-reflection coating (ARC hereafter) at $\lambda_c/2$ which leads to suppression of reflection at pass-band wavelength. At each photonic state in FIG. 1, traveling waves form standing waves whose period is $\lambda_c/2$ inside the PBG.

Figure 3:
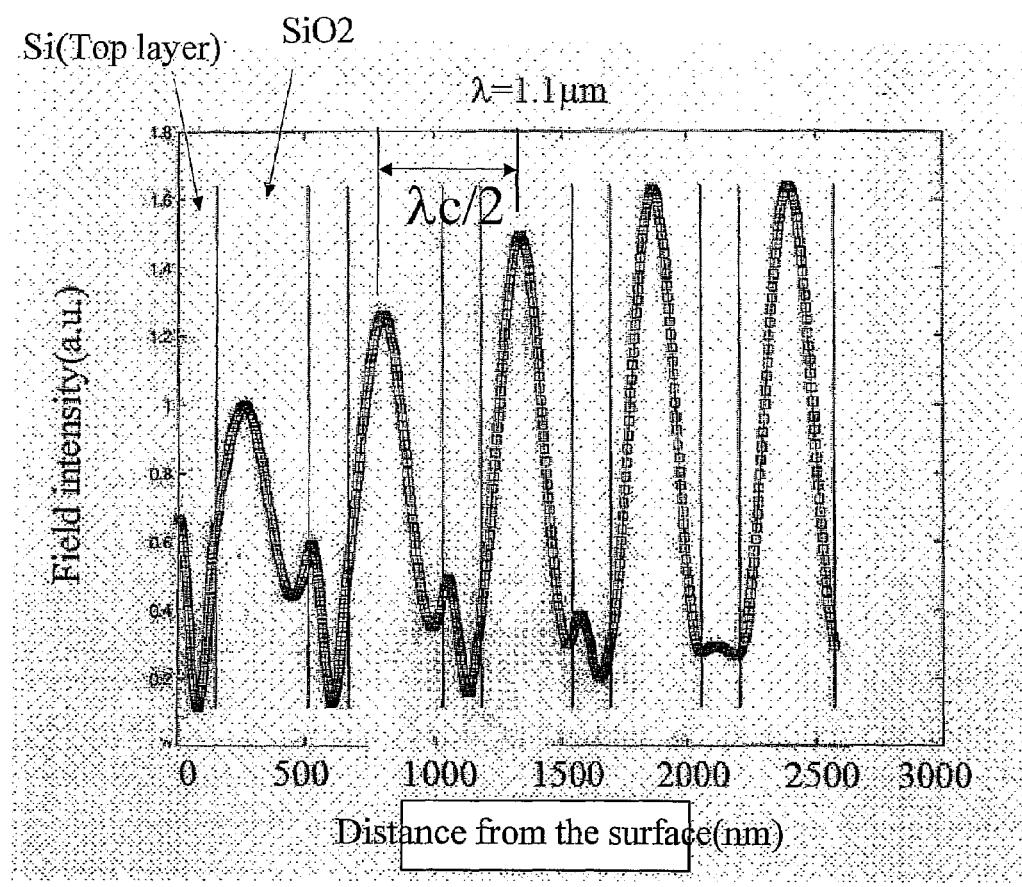
FIG. 3 shows the field intensity at one of photonic states ($\lambda$=1.1 µm)

FIG. 3 depicts how field intensity is distributed inside PBG when λ=1.1 μm (one of photonic states). As is seen in FIG. 3, standing waves form $\lambda_c/2$ long periodicity inside PBG and so do other photonic states. According to the present invention, these photonic states can be suppressed by putting anti-reflection layer for λc/2 wavelength which is a quarter of λc/2 (i.e., (λc/2)(¼)=λc/8). To achieve impedance matching, it is desirable to use a coating material that has: (1) a refractive index, $n_{ARC}$, is given by $n_{ARC}=\sqrt{n_{air} \times n_{high-indexmaterial}}$, and (2) a substantial thickness of $\lambda_c/8$.

Figure 4:
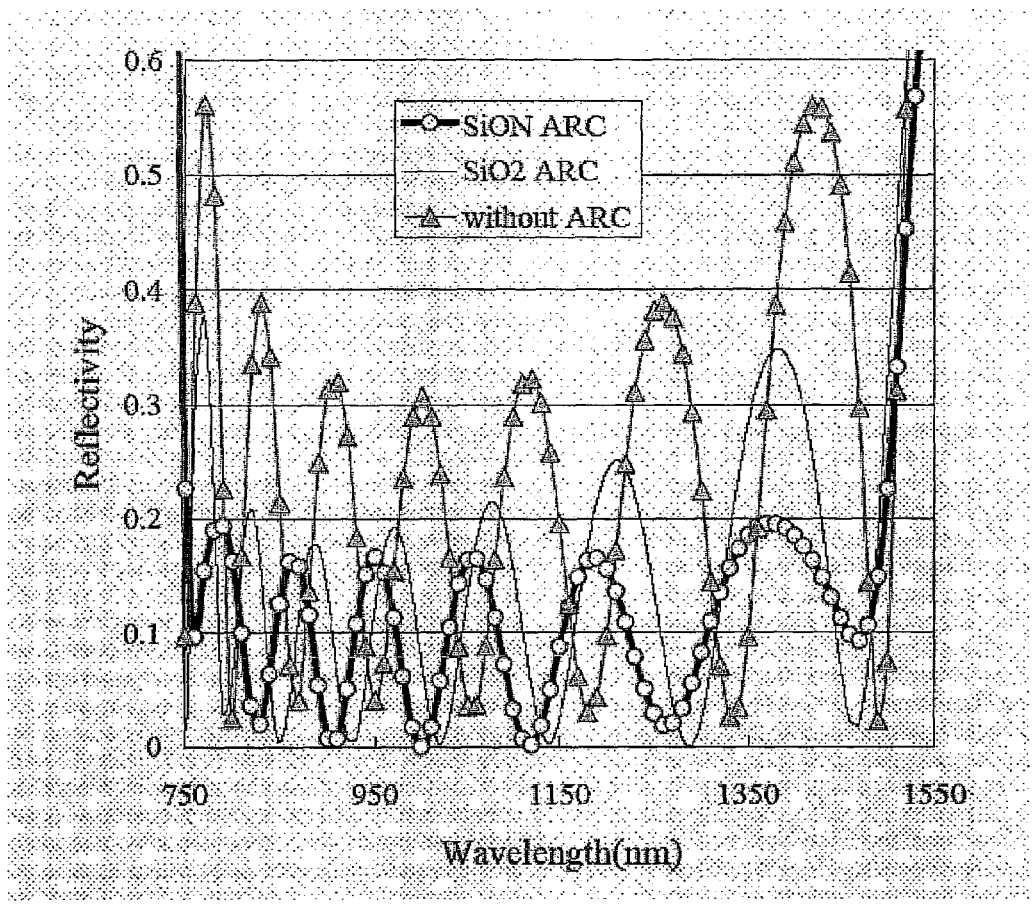
FIG. 4 shows the reflectivity of 5-pair PBG with and without anti-reflection coating.

The graph shown in FIG. 4 illustrates reflectivity of: (1) a simple 5-pair-PBG, (2) 5 pair-PBG with a $\lambda_c/8$ thick SiO$_2$ ARC layer, and (3) a 5-pair-PBG with $\lambda_c/8$ thick SiON (n=1.86). SiON denotes silicon oxynitride. As is seen in FIG. 3, reflectivity can be suppressed by putting λc/8 thick SiO$_2$ as compared to a simple 5-pair-PBG. But reflectivity at pass-band can be further suppressed by $\lambda_c/8$ thick putting SiON whose refractive index is 1.87 in this case.

FIG. 4 shows the reflectivity of 5 pair PBG with and without anti-reflection coating. It can be seen that ripple in the pass-band is significantly reduced by adding SiO$_2$ ARC but never goes to zero due to refractive index mismatch between substrate, Si, SiO2 and air. However if the SiON ARC layer is added on the top of the PBG stack instead of SiO$_2$ ARC, the ripple is reduced and the reflectance is driven to zero at discrete set of points in the pass-band. It should be noted that the center wavelength is 2.0 μm for all cases.

Figure 5:
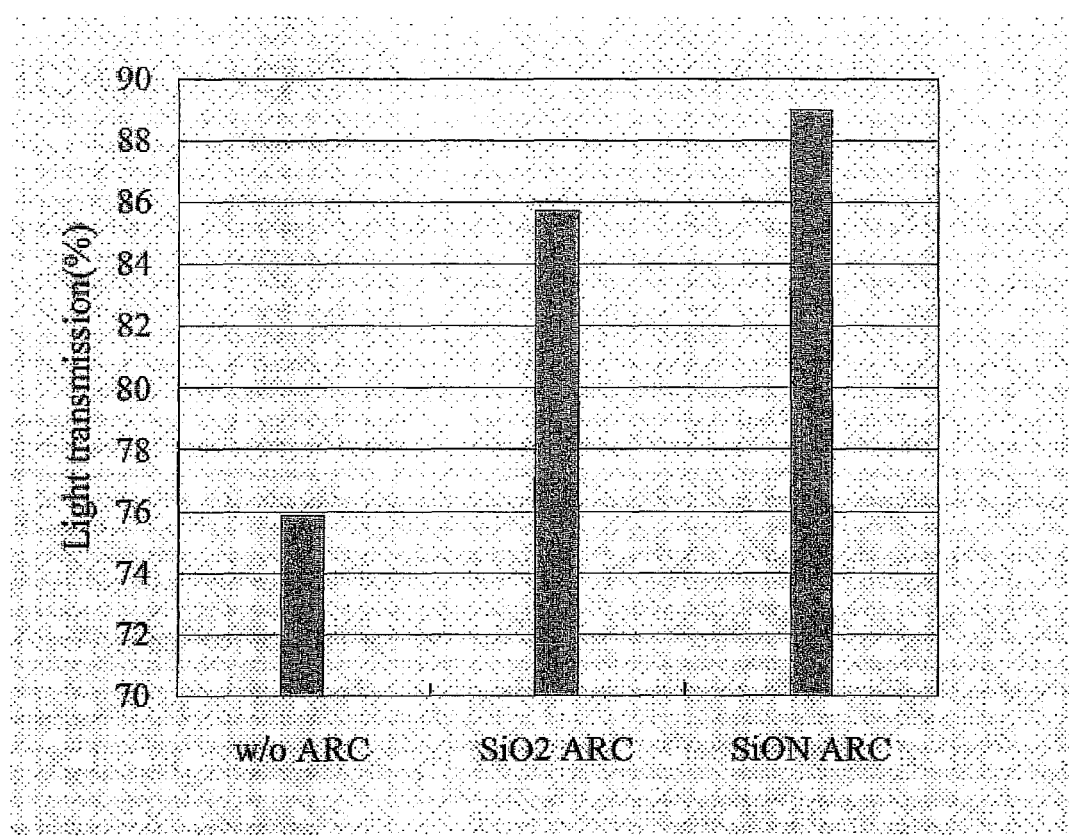
FIG. 5 shows the light transmission of PBGs through pass-band (0.78-1.5 µm).

FIG. 5 shows the light transmission of PBGs through pass-band (0.78-1.5 μm) (for case# 1—without an ARC, case# 2—with a SiO$_2$ ARC, and case#3—with a SiON ARC).

It should be noted that the proposed PBG can be made by various fabrication scheme. One of common processes is Chemical Vapor Deposition (CVD) technique. Using this technique, poly-Si and oxide can be deposited. Oxide also can be formed from thermal oxidation where oxide is made by oxidizing poly-Si layer. For other fabrication scheme, sputtering or electron-beam deposition process can be employed. For anti-reflection coating (SiON), plasma enhanced chemical vapor deposition (PECVD) is preferred since refractive index can be easily adjusted just by changing gas composition during the deposition. But sputtering or other technique can be also employed to deposit SiON.

In the present invention, the use of Si/SiO$_2$ PBG is described, but, other materials can also be used such as Si/SiN where the refractive index nitride varies from 2-2.3 depending on stoichiometry.

Conclusion

A system and method has been shown in the above embodiments for the effective implementation of an anti-reflection coating for the pass-band of photonic bandgap crystal. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by the specific high-index material used, the specific low-index material used, the specific ARC layer used, or the specific technique used in the deposition of the ARC layer.

The invention claimed is:

1. A semiconductor structure maximizing transmission of light through pass-band of a photonic bandgap crystal, said structure comprising:
   a. a photonic bandgap crystal (PBG) comprising alternating layers of high-index and low-index material, said high-index material having a refractive index of $n_{high-index\ material}$, said PBG having a center wavelength of $\lambda_c$; and
   b. an anti-reflection coating (ARC) layer disposed on top of said PBG crystal, said ARC layer having a refractive index given by $n_{ARC}=\sqrt{n_{air} \times n_{high-indexmaterial}}$ and said ARC layer having a substantial thickness of $\lambda_c/8$.

2. A semiconductor structure maximizing transmission of light through pass-band of a photonic bandgap crystal, as per claim 1, wherein said thickness is $\lambda_c/8 \pm [(0.3\lambda_c)/8]$.

3. A semiconductor structure maximizing transmission of light through pass-band of a photonic bandgap crystal, as per claim 1, wherein said ARC layer is a SiON layer.

4. A semiconductor structure maximizing transmission of light through pass-band of a photonic bandgap crystal, as per claim 1, wherein said high-index material is Si.

5. A semiconductor structure maximizing transmission of light through pass-band of a photonic bandgap crystal, as per claim 4, wherein said low-index material is SiO$_2$.

6. A semiconductor structure maximizing transmission of light through pass-band of a photonic bandgap crystal, as per claim 4, wherein said low-index material is SiN.

7. A semiconductor structure maximizing transmission of light through pass-band of a photonic bandgap crystal, as per claim 1, wherein said ARC layer is deposited via any of the following techniques: sputtering, electron beam deposition, chemical vapor deposition or plasma enhanced chemical vapor deposition.

8. A method to maximize transmission of light through pass-band of a photonic bandgap crystal, said method comprising:
   a. forming a photonic bandgap crystal (PBG) via depositing alternating layers of high-index and low-index material, said high-index material having a refractive index of $n_{high-index\ material}$, said PBG having a center wavelength of $\lambda_c$; and
   b. depositing an anti-reflection coating (ARC) layer on top of said PBG crystal, said ARC layer having a refractive index given by $n_{ARC}=\sqrt{n_{air} \times n_{high-indexmaterial}}$ and said ARC layer having a substantial thickness of $\lambda_c/8$,
   wherein said deposited ARC layer maximizes transmission of light through pass band of said PBG crystal while preserving high reflection of light through stop band of said PBG crystal.

9. A method to maximize transmission of light through pass-band of a photonic bandgap crystal, as per claim 8, wherein said thickness is $\lambda_c/8 \pm [(0.3\lambda_c)/8]$.

10. A method to maximize transmission of light through pass-band of a photonic bandgap crystal, as per claim 8, wherein said ARC layer is a SiON layer.

11. A method to maximize transmission of light through pass-band of a photonic bandgap crystal, as per claim 8, wherein said high-index material is Si.

12. A method to maximize transmission of light through pass-band of a photonic bandgap crystal, as per claim 11, wherein said low-index material is $SiO_2$.

13. A method to maximize transmission of light through pass-band of a photonic bandgap crystal, as per claim 11, wherein said low-index material is SiN.

14. A method to maximize transmission of light through pass-band of a photonic bandgap crystal, as per claim 8, wherein said ARC layer is deposited via any of the following techniques: sputtering, electron beam deposition, chemical vapor deposition or plasma enhanced chemical vapor deposition.

* * * * *